United States Patent [19]
Cox

[11] Patent Number: 5,363,677
[45] Date of Patent: Nov. 15, 1994

[54] GEAR POST STEERING COLUMN SHACKLE

[76] Inventor: Choice L. Cox, 3915 River Park Dr., Louisville, Ky. 40211

[21] Appl. No.: 54,909

[22] Filed: Apr. 29, 1993

Related U.S. Application Data

[63] Continuation-in-part of Ser. No. 803,468, Dec. 4, 1991, abandoned.

[51] Int. Cl.$^5$ .............................................. B60R 25/02
[52] U.S. Cl. .......................................... 70/18; 70/237; 70/417; 70/DIG. 57
[58] Field of Search ............... 70/18, 237, 417, 199, 70/200, 202, DIG. 57; 180/287; 292/256.67

[56] References Cited

U.S. PATENT DOCUMENTS

| | | | |
|---|---|---|---|
| D. 227,547 | 7/1973 | Bodan | D8/113 |
| D. 241,505 | 9/1976 | Henry | D8/113 |
| 1,065,103 | 6/1913 | Baum et al. | 70/18 |
| 1,348,960 | 8/1920 | Saegesser | 70/18 |
| 1,441,328 | 1/1923 | Campbell | 70/18 |
| 1,700,135 | 1/1929 | Lanes | 70/416 |
| 1,800,708 | 4/1931 | Wartian | 70/18 |
| 3,861,180 | 1/1975 | Heckrotte, Sr. et al. | 292/256.67 X |
| 3,916,658 | 11/1975 | Barry | 70/417 |
| 4,098,102 | 7/1978 | Kalina | 180/287 X |
| 4,167,222 | 9/1979 | El Bindari | 180/287 |
| 4,329,860 | 5/1982 | Moberg | 70/DIG. 57 X |
| 4,505,140 | 3/1985 | Solow | 70/18 X |
| 4,598,562 | 7/1986 | Freeman | 70/237 |
| 4,627,514 | 12/1986 | Brown | 70/417 X |
| 4,719,986 | 1/1988 | Richardson, Jr. | 180/287 |
| 4,790,406 | 12/1988 | Ferrell et al. | 180/287 |
| 4,793,164 | 12/1988 | Sloop, Sr. | 70/DIG. 57 X |
| 5,036,683 | 8/1991 | Geuvjehizian | 70/18 |
| 5,110,247 | 5/1992 | Losada | 411/441 |
| 5,197,315 | 3/1993 | Zagoroff | 70/417 |

Primary Examiner—Lloyd A. Gall
Attorney, Agent, or Firm—Middleton & Reutlinger

[57] ABSTRACT

An anti-theft device for vehicles comprising a steering column shackle in the form of a generally cylindrical collar defined by a pair of semicircular or arcuate shaped bands hingeably connected together with an adjusting lockable latch assembly. At least one of the bands comprising the sleeve has at least one opening therein to accommodate a shift lever extending from the steering column. The sleeve is positioned around the steering column and shift lever and locked with a key to prevent thieves from breaking the tubular steering column housing open, exposing the ignition starting and gearshift rod mechanisms therein.

7 Claims, 3 Drawing Sheets

GEAR POST STEERING COLUMN SHACKLE

This application is a continuation-in-part of U.S. patent application Ser. No. 07/803,468 filed on Dec. 4, 1992, now abandoned.

BACKGROUND OF THE INVENTION

1. Field of the Invention

This invention relates to a anti-theft locking device for vehicles and more particularly relates to a steering column protective locking device mounted thereon for rendering the shift lever immobile and providing a protective shield covering the portion of the steering column housing, the ignition switch and transmission linkage.

2. Description of the Prior Art

The present invention is designed to deter the thief of old or new automobiles which are routinely stolen for illegal use. Automobiles and light trucks have a steering column composed of hard plastic or "pot metal" which is a brittle alloy often used in combination with some type of plastic covering. An expert thief, can take a hammer or some other heavy object and break through the steering column housing within less than a minute to expose the ignition switch and transmission shift mechanism housed therein. The steering wheel locking tab which is coupled and engaged or disengaged with the rotation of the ignition key switch is exposed through the hole formed in the column housing, and can be broken off or bent out from disengagement within seconds. The shift register mechanism to start the vehicle and shift gears can be readily reached within the column. A thief may simply start the ignition, put the car in gear and drive away within a matter of minutes.

There are a number of automobile thief protection devices on the market. Some such as "THE CLUB" ® provide a longitudinal shaft which are removably and lockably attached to the steering wheel and foot pedal of the automobile. Another type of auto protection device is push button door entry mechanism used on new vehicles. Yet another type of anti-theft device consists of an alarm system, electrically operated which goes off upon the automobile being moved or shaken. However, any of these inventions can be disabled by a crafty thief by disabling the electrical system, bypassing the alarm, or sawing through a "pedal/steering wheel" immobilizing device.

The conventional protection devices are directed toward protection of the portion of the steering column containing the ignition switch. The devices neither teach nor suggest protection of the portion of the steering column below the ignition switch. It is not necessary to damage the upper part of column housing the ignition to steal an automobile. It is only necessary to damage the lower portion of the column housing, the starter and transmission linkage.

For example, U.S. Pat. No. 4,598,562 by Freeman, shows a protection device wherein a semi-cylindrical shaped member covers the portion of the steering column having the turn signals levers extending therefrom, and is connected to a pair of narrow bands which fit on either side of the ignition switch to provide mounting of the device onto the steering column and ignition. The open portion of the anti-theft device exposed thereinbetween the narrow bands renders that portion of the steering column housing vulnerable to damage, for instance by a hammer to break the column housing loosening the Freeman jacket housing and providing a starting pry point to remove the housing from the column. Moreover, Freemans's lock mechanism consists of a padlock, wherein the shackle of the padlock can easily be cut with a pair of bolt cutters.

SUMMARY

The present invention relates to a steering column protection device removably mounted around a steering column housing having at least one lever or gear post extending generally perpendicular from the column. The gear post steering column shackle includes a collar defined by a pair of generally semicircular bands hingeably connected together circumscribing a portion of the steering column housing. At least one of the bands has an opening for cooperating with a lever for limiting rotational and axial movement of the collar on the steering column. The shackle includes a means for locking the collar bands together in cooperative relationship for securing the bands tightly around the steering column.

The protective collar of the present invention fits snugly around and totally encloses the protected portion of the column housing to minimize irregular surfaces and spaces between the collar body and the column housing body to prevent a thief from prying apart or cutting the collar from the column. The present invention uses a lock mechanism whereby a special key can be made to fit the lock, and the lock mechanism is protected within the collar frame to prevent cutting of the lock shackle. Incorporated within the lock mechanism is a means of adjustably tightening the collar for adaptation to steering wheel columns of varying diameters for different vehicles. The adjustable tightening means comprises a simple threaded opening within a flange extending from one of the bands which receives a longitudinal member or bolt which can be screwed through the flange without abutting an end wall by simply turning the bolt with a key.

The present invention provides a means of adjusting the collar around steering column housings to provide for a snug fit for column housing of various sizes. The locking mechanism provides for an adjustable fitting collar around the steering column housing which can be utilized as a separate protective covering or welded onto the sleeve as an integral part of the sleeve.

The present invention is designed to protect the portion of the steering column below the ignition switch containing the shifting mechanism and mechanical linkage connecting the ignition switch. Moreover, the sleeves of the steering column protection device completely surround and enclose a section of the steering column located below the ignition switch.

It is an object of the present invention to prevent a thief or anyone from breaking through the brittle material forming the steering wheel column.

It is an object of the present invention to provide a totally enclosed lock mechanism so that no portion of the assembly is vulnerable to being cut with bolt cutters.

It is another object of the present invention to provide a inexpensive protection device manufactured from light, yet hard or tough material such as steel.

It is yet another object of the present invention to provide a protection device which may utilize lock mechanisms having a matching key.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
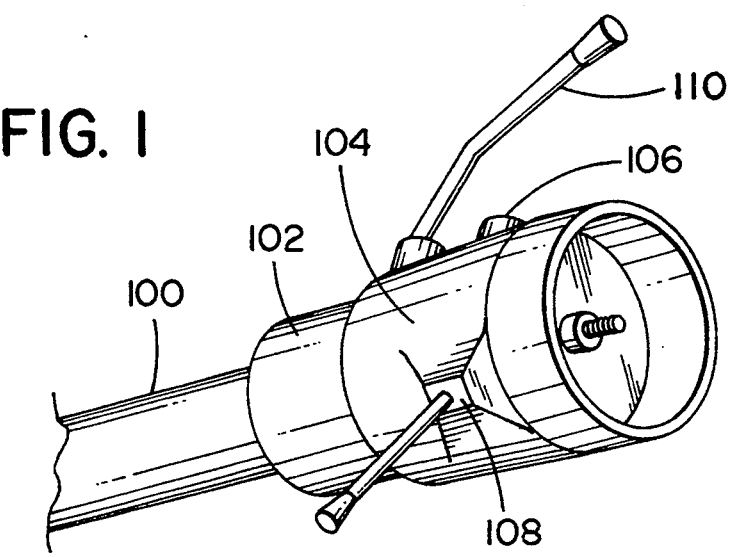
FIG. 1 is a perspective view showing the steering column of the present invention.

In accordance with FIG. 1, a conventional steering wheel column 100 for supporting a steering wheel is shown having a bowl 102 and a cover 104 enclosing internal components of the steering wheel. Typically a locking device is incorporated within the ignition system 106 which is positioned opposite a turn signal assembly 108. The gear shift 110 is usually located below the ignition 106 and turn signal assembly 108.

Figure 2:
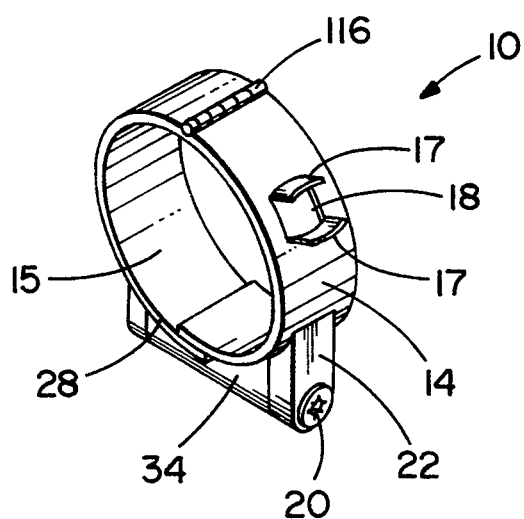
FIG. 2 is a perspective view showing the rotatable gear post steering column shackle of the present invention.

As shown in FIG. 2, the gear post steering column shackle 10 of the present invention is an anti-theft device for vehicles, comprising a collar 12 defined by a first generally semicircular or arcuate shaped solid band 14 and a second generally semicircular or arcuate shaped solid band 15 formed from a tough material. The material may be steel, aluminum, brass, iron, or combinations thereof. More particularly the preferred embodiment of the present invention is fabricated from twenty gauge steel metal. The collar 12 is mounted below the ignition assembly 106 and turning signal assembly 108 so as to enclose the portion of the steering column 100 housing the gearshift lever, and the distal ends of the starting and mechanical gear shift rod mechanisms and the electrical switch mechanisms extending upward into the steering column 10 as illustrated in FIG. 3.

Figure 4:
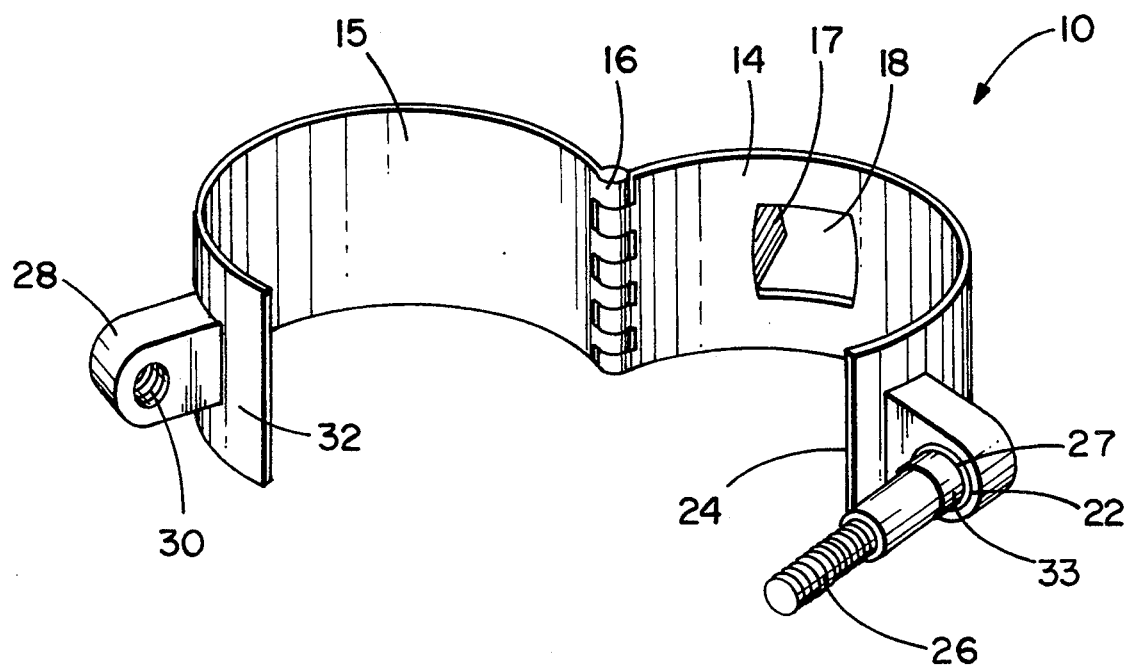
FIG. 4 is a perspective view of FIG. 2 showing the hinged shackle in the open position.

The first band 14 and second band 15 are hingeably connected together with a strong hinge 16 such as a single-stamped integral hinge or a double-leaf "piano" hinge that can open and close as shown in FIG. 4. At least one of the bands 14, 15 comprising the collar 12 has at least one opening 18 therein surrounded by a pair of flanges 17 extending from either side thereof to accommodate a shift lever 110 or "gear post" extending from the steering column 100 of the vehicle so that the collar 10 cannot slide up or down on the steering column 100.

Figure 3:
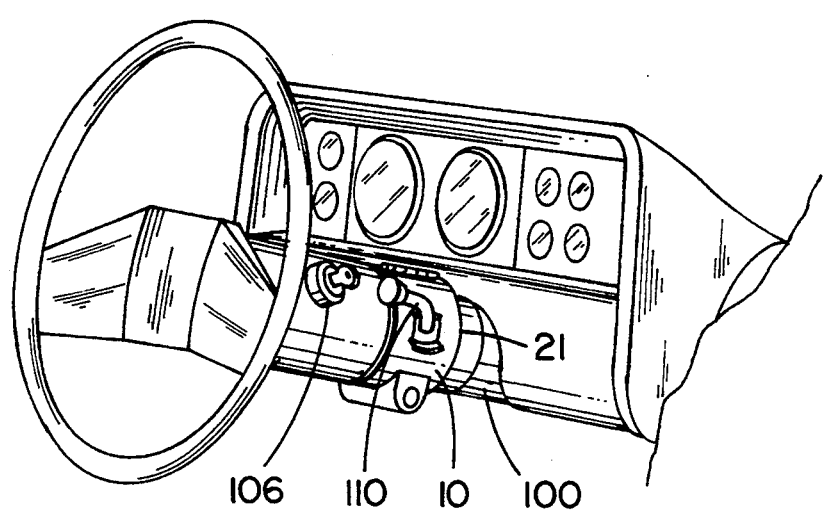
FIG. 3 is a perspective view showing the rotatable gear post steering column shackle of the present invention mounted upon the steering column of FIG. 1.
Figure 5:
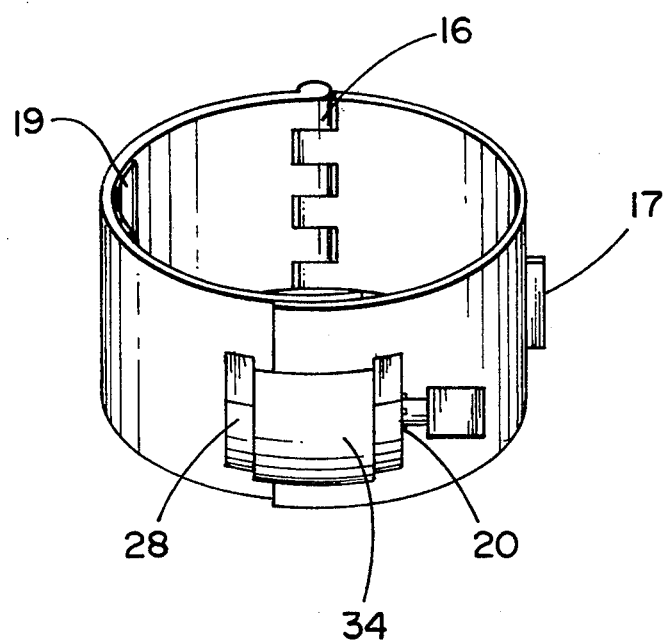
FIG. 5 is a perspective view of an alternate embodiment of FIG. 2, showing the hinged shackle in the closed position having a projecting tab extending from one of the bands.

A projection or tab 19, such as is shown in FIG. 5, may be welded onto one or both of the bands 14, 15 or be welded as a continuous lip around the bottom of the bands 14, 15 to be supported by and slidably guided by the groove 21 in the steering column 100 between the bowl 102 and cover 104 shown in FIG. 3.

Figure 6:
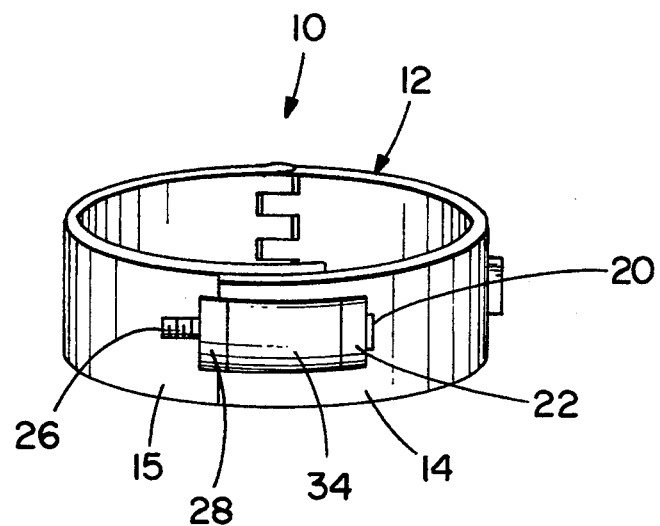
FIG. 6 is a perspective view of the rotatable gear post steering column shackle of the present invention, showing the hinged shackle in the closed position.
Figure 7:
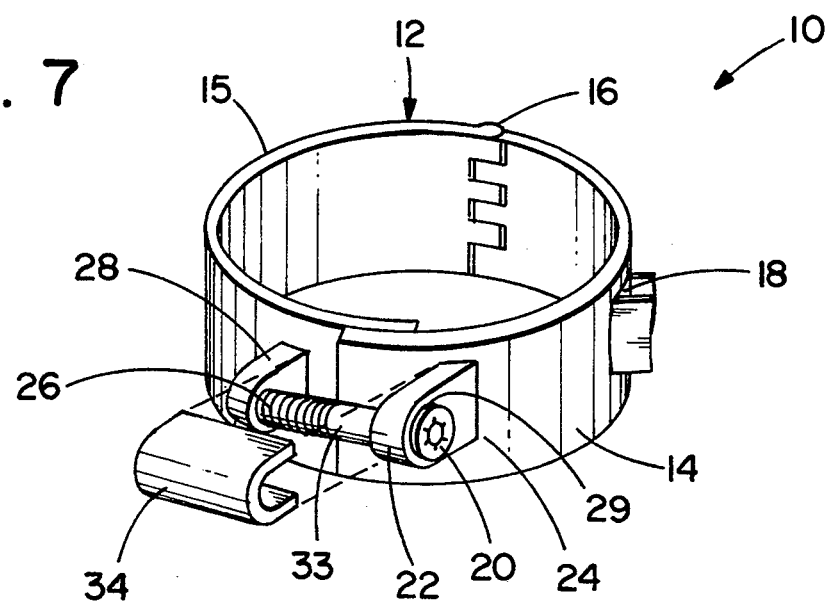
FIG. 7 is a perspective view of FIG. 6 of the rotatable gear post steering column shackle of the present invention, showing the position of the lock and orientation of the gear post opening.

The shackle 10 includes a lockable latch assembly further including a lock 20 removably mounted within a bracket 22, having an opening therein which extends generally perpendicular from a distal end 24 of the first band 14, generally opposite the hinge 16. The lock 20 has a longitudinal member such as a threaded bolt 26 rotatably extending therefrom generally perpendicular to the first band body 14 which threadably engages a flange 28 having a threaded hole 30 therein extending generally perpendicular from the distal end 32 of second band 15 opposite the hinge 16. The flange 28 is positioned in alignment with the bolt 26 when the shackle 10 is in the closed position as best shown in FIG. 3. The bolt 26 and threaded hole 30 provide a means to tighten or loosen the collar 12 for adjustment by drawing the distal ends of the bands 14, 15 together so that one of the bands 14, 15 overlaps the other band 14, 15, as shown in FIGS. 4, 6, and 7. The versatility of the present invention is enhanced by the feature of having a threaded hole 30 through the flange 28 rather than having a flange 28 with an end plate in order for the length of the bolt 26 to be selected to provide a large amount of adjustment of the shackle 10 to various sized gear shift columns 100. The lock 20 having a threaded cylinder or bolt 26 attached thereto is rotatably held within a lock housing having an outer lip 29 at one end, and having an opposite end having a plurality of threads 33 extending around the external surface thereof, whereby the bracket 22 is immovably secured between the outer lip 29 and a lock nut 27 threadably engaging the threads 33 of the lock housing covered by a protective flange 34 as shown in FIGS. 4 and 7.

As shown in FIGS. 2 and 5, the protective flange 34 is welded onto one of the bands 14, 15. An alternate embodiment is shown in FIG. 7, wherein a protective cover 34 for protecting the bolt 26 is formed from a "U-shaped" piece of metal placed around the bolt 26 and between the bracket 22 and the flange 28 so that tightening of the collar exerts pressure on the protective cover 34 preventing its removal.

Figure 8:
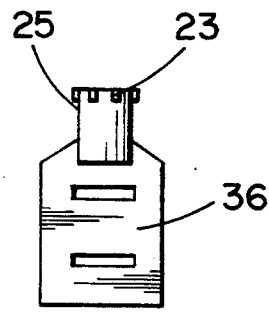
FIG. 8 is a plan view of the key to the lock of the rotatable gear post steering column shackle of FIG. 1.

As shown best in FIG. 8, the lock 20 utilizes a selected key 36 having a series of indentations 23 and projections 25 which fit in a cooperative relationship with a plurality of spring loaded pins (not shown) disposed within the body of the lock 20. Only a selected key 36 may be inserted within the lock 20. After insertion of the key 36, the key must be pushed inward engaging certain of the pins and simultaneously twisted in order to cooperatively engage and rotate the bolt 26 for engaging the threaded hole 30.

The shackle 10 is positioned around a steering column 100 and the shift lever 110, and locked with the selected key 36 to prevent thieves from breaking the tubular steering column 100 housing open, exposing the ignition starting and gearshift mechanisms therein.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

I claim:

1. A rotatable steering column shackle protection device for removably mounting around a steering column housing below an ignition switch comprising:

a collar shackle defining a first generally semicircular solid band and a second generally semicircular solid band hingeably connected together circumscribing and totally enclosing a portion of said steering column housing;

at least one of said bands having at least one opening therein for cooperating with a gear shift lever and for limiting rotational and axial movement of said collar on said steering column housing;

means for holding, adjustably tightening, and locking said bands together comprising a bracket having an opening therein extending from said first band, a flange having an opening therein extending from said second band, and a longitudinal member rotatably connected to said bracket threadably engageable with said opening of said flange, and the distal end of said first band overlapping the distal end of said second band upon tightening said means for holding, adjustably tightening and locking said bands together;

a lock latch assembly comprising a lock removably mounted and enclosed within said bracket in cooperation with said longitudinal member extending therefrom being secured to said bracket for adjusting the tightness of said first band with said second band around said steering column housing and locking said first band and said second band together; and a protective cover for protecting said means for holding, adjustably tightening and locking said bands together.

2. The rotatable steering column shackle protection device of claim 1, wherein said longitudinal member extending from said lock is a bolt having a threaded end, and said opening within said flange is threaded, and said longitudinal member is threadably engaged with said opening of said flange.

3. The rotatable steering column shackle protection device of claim 1, including a projection extending inwardly normal to at least one of said bands engageable with a groove between a steering column cover and a steering column bowl for supporting and guiding rotation of said collar therearound.

4. The rotatable steering column shackle protection device of claim 3, wherein said projection is at least one tab extending from the bottom of said first band or said second band.

5. The rotatable steering column shackle protection device of claim 1, wherein said protective cover comprises a strip of metal positioned around said longitudinal member covering an exposed portion of said longitudinal member between said bracket and said flange so that adjustably tightening said collar exerts pressure on said protective cover to hold said protective cover in place and prevent shearing or cutting of said longitudinal member.

6. The rotatable steering column shackle protection device of claim 5, wherein said protective cover comprises a strip of metal attached to form a housing in cooperative engagement with said bracket.

7. The rotatable steering column shackle protection device of claim 1, including a flange extending from at least one side of said at least one gearshift opening.

* * * * *